United States Patent
Wignall et al.

(10) Patent No.: US 7,502,279 B2
(45) Date of Patent: Mar. 10, 2009

(54) TARGET DIRECTION INDICATION AND ACOUSTIC PULSE ANALYSIS

(75) Inventors: Alan Wignall, Chesham (GB); John David Martin, Great Missenden (GB)

(73) Assignee: Ultra Electronics Limited, Middlesex (GB)

( * ) Notice: Subject to any disclaimer, the term of this patent is extended or adjusted under 35 U.S.C. 154(b) by 325 days.

(21) Appl. No.: 11/351,995

(22) Filed: Feb. 10, 2006

(65) Prior Publication Data

US 2006/0291331 A1 Dec. 28, 2006

(30) Foreign Application Priority Data

Feb. 15, 2005 (GB) .................... 0503212.3

(51) Int. Cl.
*F41G 3/00* (2006.01)
(52) U.S. Cl. ....................... 367/118; 367/906
(58) Field of Classification Search ................. 367/136, 367/906, 128, 124
See application file for complete search history.

(56) References Cited

U.S. PATENT DOCUMENTS

| | | | |
|---|---|---|---|
| 3,614,723 A * | 10/1971 | Hermes et al. | 367/128 |
| 4,470,817 A | 9/1984 | Diehl et al. | |
| 5,241,518 A | 8/1993 | McNelis et al. | |
| 5,611,502 A | 3/1997 | Edlin et al. | |
| 5,729,507 A * | 3/1998 | Massa et al. | 367/124 |
| 6,178,141 B1 | 1/2001 | Duckworth et al. | |
| 6,621,764 B1 * | 9/2003 | Smith | 367/128 |
| 2006/0291331 A1 * | 12/2006 | Wignall et al. | 367/906 |

FOREIGN PATENT DOCUMENTS

| | | | |
|---|---|---|---|
| EP | 0471225 | | 2/1992 |
| EP | 0527715 | | 2/1993 |
| EP | 0579187 | | 1/1994 |
| GB | 2033619 | | 5/1980 |
| GB | 2423140 A | * | 8/2006 |
| JP | 04103995 | | 2/1992 |

\* cited by examiner

*Primary Examiner*—Dan Pihulic
(74) *Attorney, Agent, or Firm*—Welsh & Katz, Ltd.

(57) ABSTRACT

A method of providing an indication of the direction of a target such as a sniper. A rifle mounted sensor array detects an acoustic pulse originating from the target. The signal is processed to estimate the direction of the target, and an indication is provided when the weapon is aligned with the estimated direction. The direction of arrival of an acoustic pulse is estimated by spectrally decomposing each signal from the sensor so as to generate one or more spectral components for each signal, and processing the spectral components to estimate the direction of arrival.

21 Claims, 10 Drawing Sheets

View in plane containing the trajectory and the receiver:

TARGET DIRECTION INDICATION AND ACOUSTIC PULSE ANALYSIS

FIELD OF THE INVENTION

The present invention relates in a first aspect to a method and apparatus for providing an indication of the direction of a target, and in a second aspect to a method and apparatus for estimating the direction of arrival of an acoustic pulse. Both aspects may be employed typically, although not exclusively, in a system for identifying the direction and/or range of a sniper and/or determining the trajectory of a bullet fired by the sniper.

BACKGROUND OF THE INVENTION

U.S. Pat. No. 6,178,141 describes a system for determining the trajectory of a supersonic bullet by observing the shock wave from the bullet. Muzzle blast observations may also be used to estimate the exact sniper location along the trajectory. The sensors are helmet-mounted, and each helmet is supported by wireless communications, GPS and a backpack or otherwise mounted computer system that computes and displays the solutions.

SUMMARY OF THE INVENTION

A first aspect of the invention provides a method of providing an indication of the direction of a target, the method comprising the steps of detecting a signal originating from the target; processing the signal to estimate the direction of the target relative to a weapon; and providing an indication when the weapon is aligned with the estimated direction of the target.

The first aspect of the invention also provides apparatus for providing an indication of the direction of a target, the apparatus comprising a sensor for detecting a signal originating from the target; a processor for processing the signal to estimate the direction of the target relative to a weapon; and a direction indicator for providing an indication when the weapon is aligned with the estimated direction of the target.

The first aspect of the invention presents a new method and apparatus for presenting target direction information to a user. By providing a user with an indication when a weapon (typically held or controlled by the user) is aligned with the estimated direction of a target such as a sniper, the user can quickly and accurately return fire.

Preferably the apparatus comprises an orientation sensor for providing an output indicative of the direction of the weapon, and the direction indicator provides an indication when the output from the orientation sensor indicates that the weapon is aligned with the estimated direction of the target.

The signal originating from the target may be a visual signal (such as a visual muzzle flash) but most preferably the signal is an acoustic signal such as a muzzle blast or projectile shock wave.

The signal may be detected by helmet-mounted sensors as in U.S. Pat. No. 6,178,141. However in some situations it may be preferable for the user to be operating in a "helmets off" environment. Also, if the sensors are helmet-mounted then a complex system must be provided to estimate the target direction relative to the weapon. Therefore preferably the signal is detected by one or more sensors mounted on the weapon.

Preferably the indication is also provided by an indicator mounted on the weapon.

Preferably the sensor, indicator and processor are mounted in a common housing.

In a preferred embodiment an indication is provided when the weapon is aligned with a vertical and/or horizontal plane containing the estimated target direction.

The indication may be visual or audible. In a preferred example the colour of a visual indicator is changed when the weapon is aligned with the estimated direction of the target.

The signal is typically detected by a plurality of sensors which may be arranged in a planar array, or in a volumetric array. Preferably the spacing (or baseline) between the sensors is small, in order to reduce the size of the apparatus. Small spacing does however make it difficult to accurately estimate the target direction. Therefore preferably one of the following methods is used to address this problem:

i. using a conventional time-of-arrival method in which a threshold crossing point is detected for each sensor. In this case the sampling frequency can be increased to take account of the reduced sensor baseline; or ii. cross-correlating one or more pairs of sensor signals in the time domain so as to generate one or more cross-correlation signals which are then used in the target direction estimation; or iii. spectrally decomposing each sensor signal so as to generate one or more spectral components for each signal which are then used in the target direction estimation.

Method iii) is preferred, and is discussed in further detail below with reference to the second aspect of the invention.

The weapon may be a tank or helicopter, but preferably the weapon is a hand-held weapon such as a rifle.

Preferably the (or each) sensor is mounted on the sight of the weapon. This automatically aligns the sensors with the sight and enables more accurate targeting.

The direction and/or range indicators may also be mounted on the sight to provide a compact integrated system.

In U.S. Pat. No. 6,278,141, fine resolution time difference of arrivals, for the shock wave arrivals, are determined via cross-correlation between the channels. The data are interpolated eight times during the cross-correlation process.

A second aspect of the invention provides a method of estimating the direction of arrival of an acoustic pulse, the method comprising:

a. detecting the pulse with a plurality of sensors so as to generate a plurality of sensor signals;

b. spectrally decomposing each sensor signal so as to generate one or more spectral components for each signal; and c. processing the spectral components to estimate the direction of arrival of the acoustic pulse.

The second aspect of the invention also provides apparatus for detecting the direction of arrival of an acoustic pulse by the above method, the apparatus comprising an array of sensors; and a processor programmed to perform steps b and c.

The second aspect of the invention provides a processing method which enables the sensor signals to be sampled at a low rate (which may be as low as the Nyquist rate), whilst maintaining an accurate estimate. Spectrally decomposing the sensor signal reduces the effects of noise, compared with a conventional time-of-arrival method in which a threshold crossing point is detected for each sensor. The second aspect of the invention is particularly suited to use in a volumetric sensor with a small baseline.

In one example of the second aspect of the invention, the direction of arrival is calculated by performing a power versus bearing scan. This provides improved accuracy through "bearing coherent" averaging of noise. However for some applications this method may be overcomplicated. Therefore in a preferred embodiment the pulse is detected with a volumetric array of three or more pairs of sensors in step a. so as to generate three or more pairs of sensor signals; a plurality of pairs of spectral components are generated for each pair of sensor signals in step b; and step c. includes calculating a phase delay between each pair of spectral components, and determining the direction of arrival of the acoustic pulse in accordance with the calculated phase delays. The preferred embodiment is computationally simpler than a power versus bearing scan, and also provides improved accuracy through "bearing coherent" averaging of noise.

The method may be used in any suitable application, but in preferred examples it is used to estimate the direction of a target and/or to estimate the trajectory of a projectile.

BRIEF DESCRIPTION OF THE DRAWINGS

Various embodiments of the present invention will now be described with reference to the accompanying drawings, in which:

FIG. 5 is a graph showing a pulse waveform $x_n$, a pulse $y_n$ with uniform noise spread over the bandwidth of the pulse, and a spectral analysis window function, all used in a simulation of method a;

FIG. 6 is a graph showing spectra for the pulse and noise used in the simulation of method a;

FIG. 7 is a graph shows a pulse waveform, noise waveform, and threshold level used in the simulation of method a;

FIG. 8 is a graph showing bearing errors calculated in the simulation of method a;

DETAILED DESCRIPTION OF EMBODIMENTS

Figure 1:
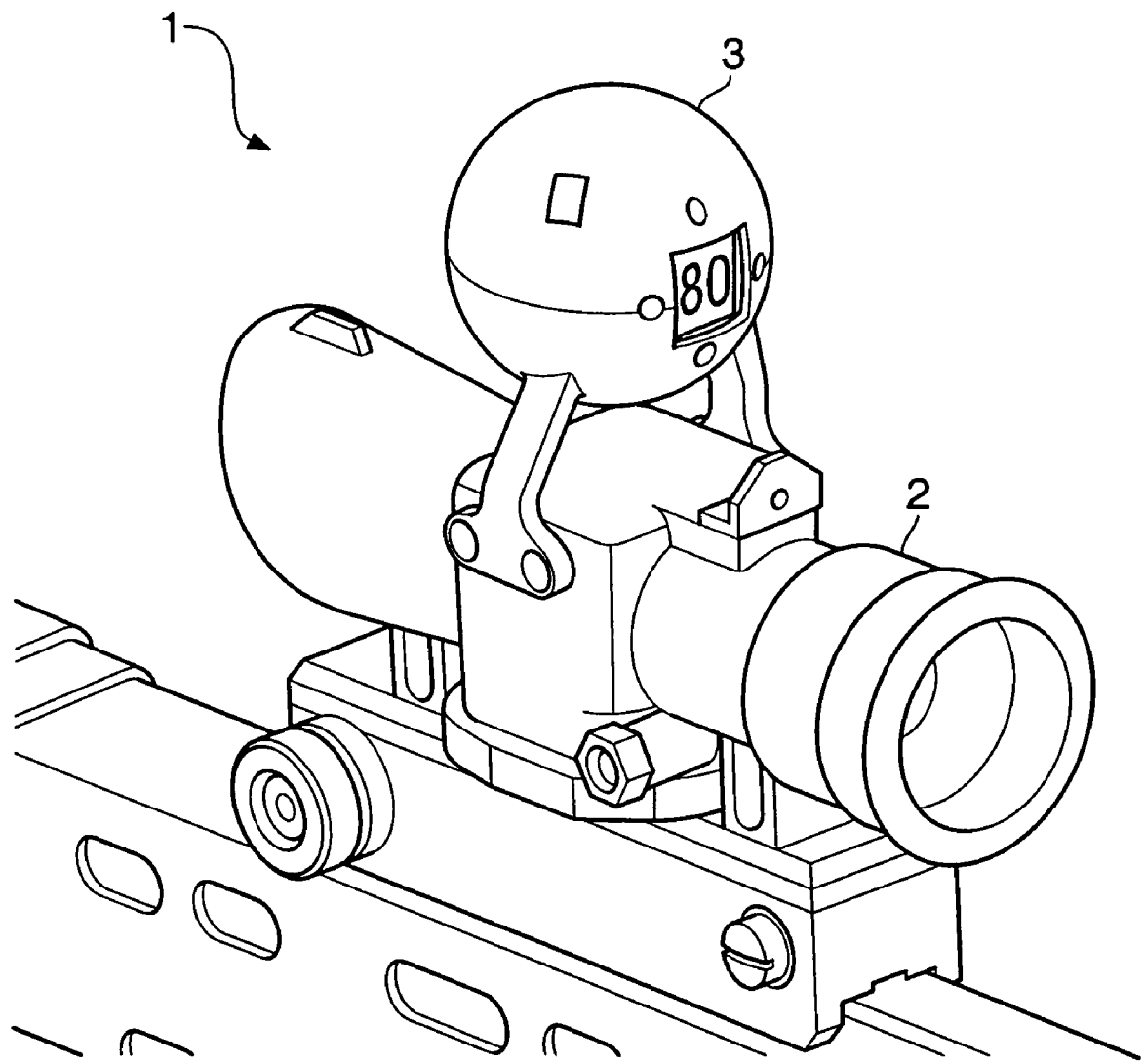
FIG. 1 is a perspective view of part of a rifle incorporating an acoustic sensor device.
Figure 2:
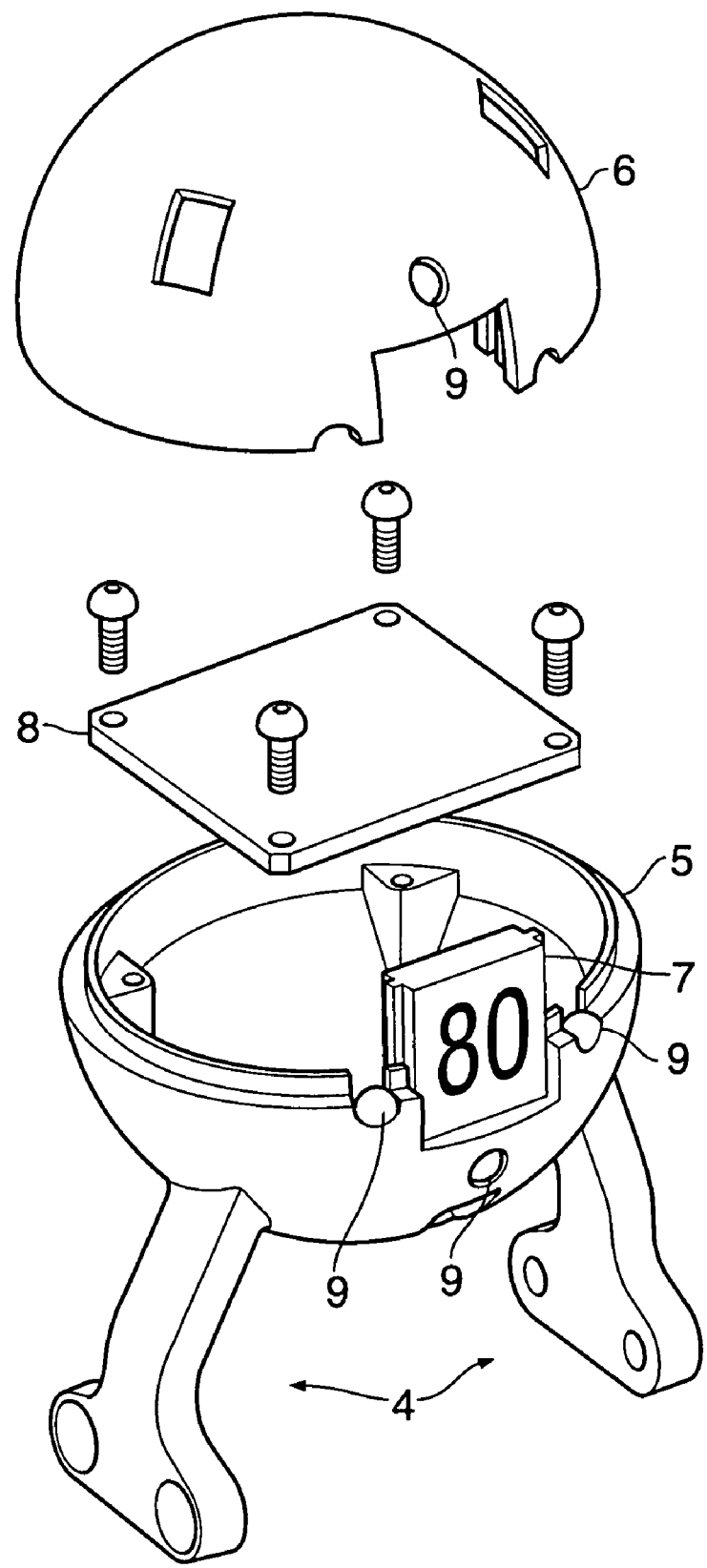
FIG. 2 is an exploded view of the acoustic sensor device, with some parts omitted.

FIG. 1 shows a rifle 1 with a sight 2, and an acoustic sensor device 3. The device 3 is shown in further detail in FIG. 2. The device 3 has a pair of mounting legs 4 which are screwed in place onto the sight 3 and a housing comprising upper and lower hemispheres 5,6. A digital range display 7 is mounted on the lower hemisphere 5, in this case showing a range of 800 m. A support plate 8 is screwed onto the lower hemisphere 5. Three light emitting diodes (LEDs) 9 are mounted in the lower hemisphere 5 and one in the upper hemisphere 6

Figure 3:
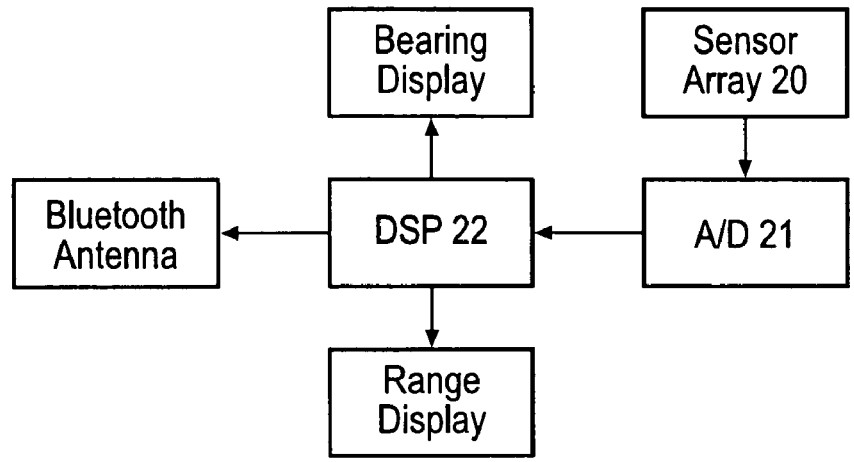
FIG. 3 is a schematic view of the components of the acoustic sensor device.

FIG. 3 is a schematic view showing various component parts of the device 3, some of which are omitted from FIG. 1 for clarity. A volumetric array 20 of six miniature microphones is mounted to the support plate 8. The microphones are arranged in orthogonal positions around a sphere, with a diameter of between about 4 and 6 cm. The microphones are digitally sampled by an analogue to digital converter 21 and processed by an embedded digital signal processor (DSP) 22. A pseudo-omni output is formed for automatic detection of impulsive noise. The relative phases of all six microphones are then used to estimate the 3-dimensional direction of arrival of the detected sound. Systematic errors associated with the construction or mounting of the device (e.g. due to resonance, coupling or shading) can be precalibrated. Adaptive processing can be used to reject noise and interference.

The DSP 22 controls the LEDs 9, and range display 7, and also outputs data to a Bluetooth antenna or other wireless data link.

Figure 3A:
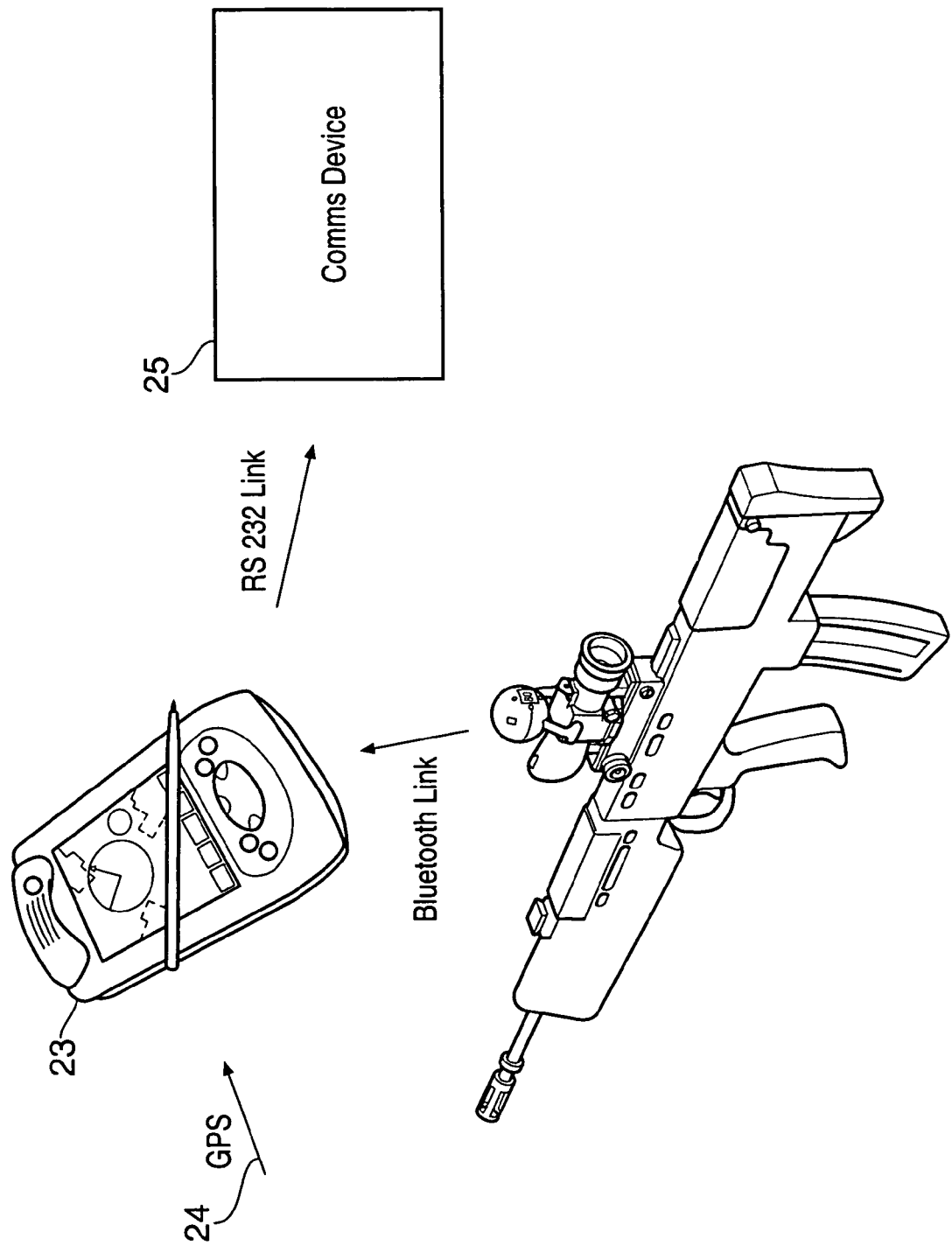
FIG. 3a is a schematic view of the rifle in combination with a PDA and communication device.

As shown in FIG. 3a, the Bluetooth antenna communicates with a personal digital assistant (PDA) 23 which is carried by the soldier. The PDA 23 also receives GPS data 24, and displays range and direction information in a map-based format. The PDA 23 is connected to a radio communication device 25 via an RS232 link.

Figure 4:
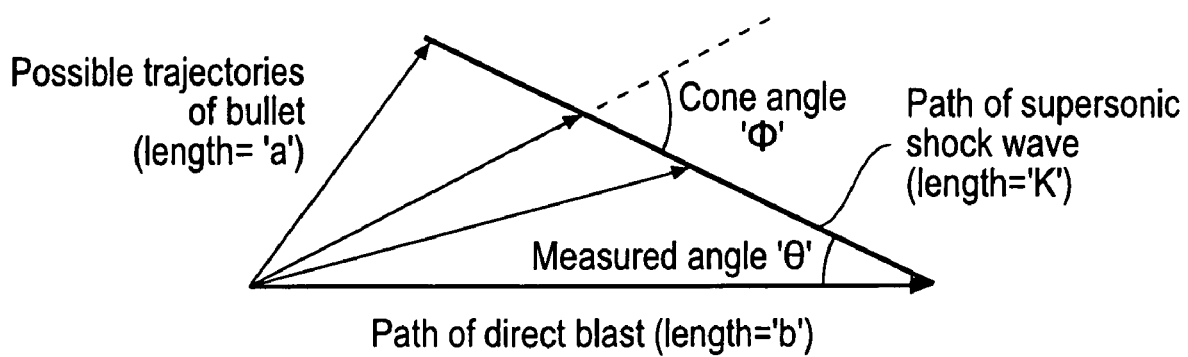
FIG. 4 is a schematic view of a bullet trajectory, as viewed in a plane containing the trajectory and receiver.

The DSP 22 estimates the direction of the muzzle blast pulse, and the direction of the shock wave pulse. The range is then estimated by the DSP 22 using the method illustrated in FIG. 4. The shot is fired from the left hand corner, and is detected at the right hand corner. The muzzle blast travels directly between the target and the receiver. The shock wave from the passing bullet arrives from a different angle. By measuring the included angle, and the time delay between the two events, and making assumptions about the speed and deceleration of the bullet, a range estimate can be computed.

Figure 3B:
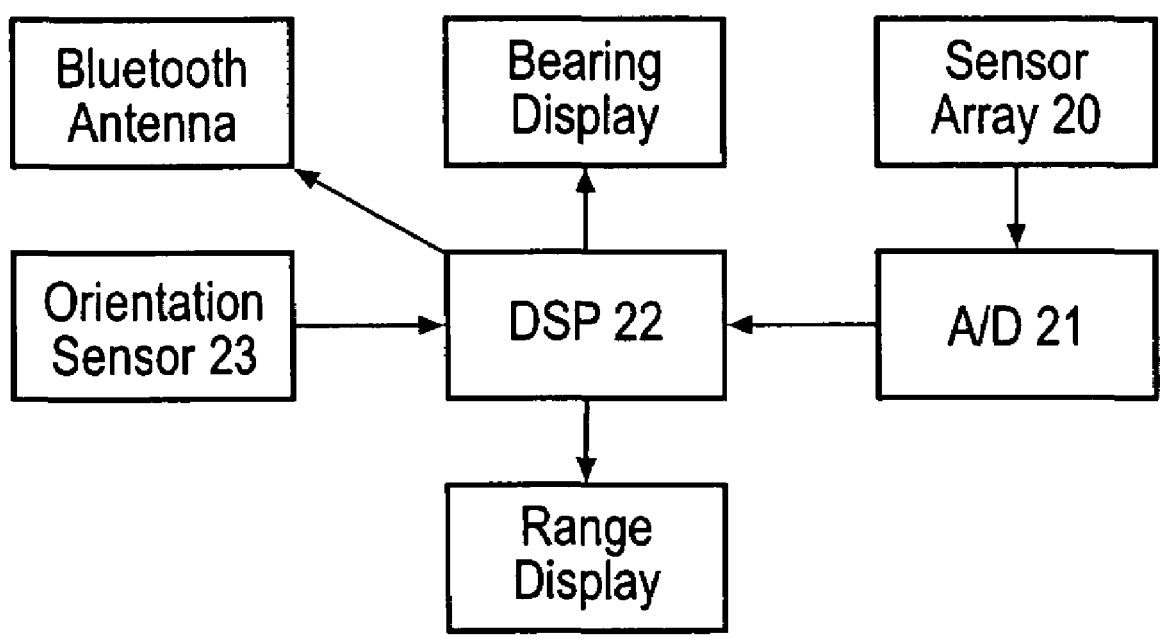
FIG. 3b is a schematic view of the components of a second acoustic sensor device.
Figure 5:
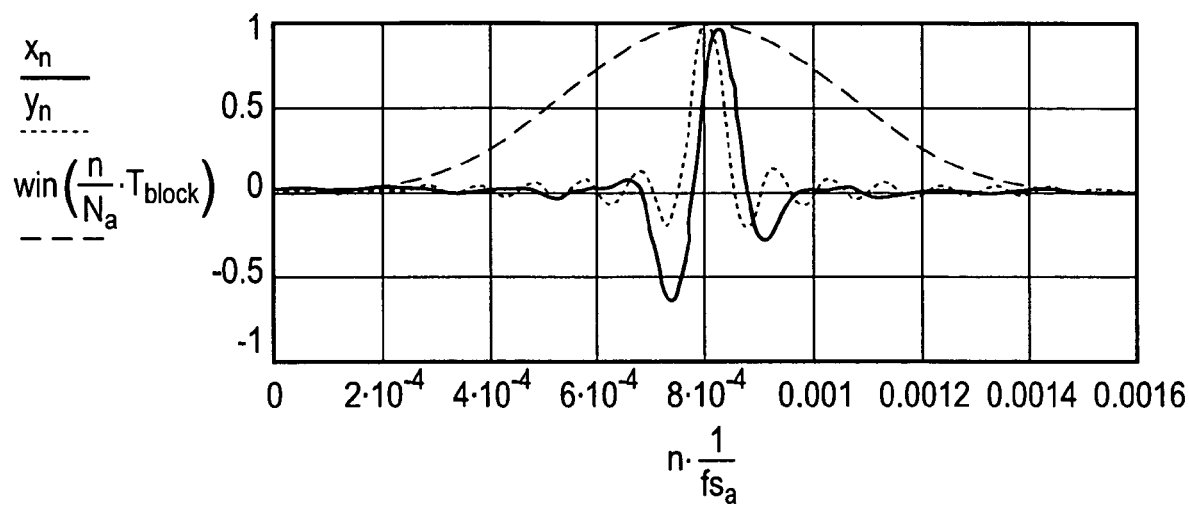
Figure 6:
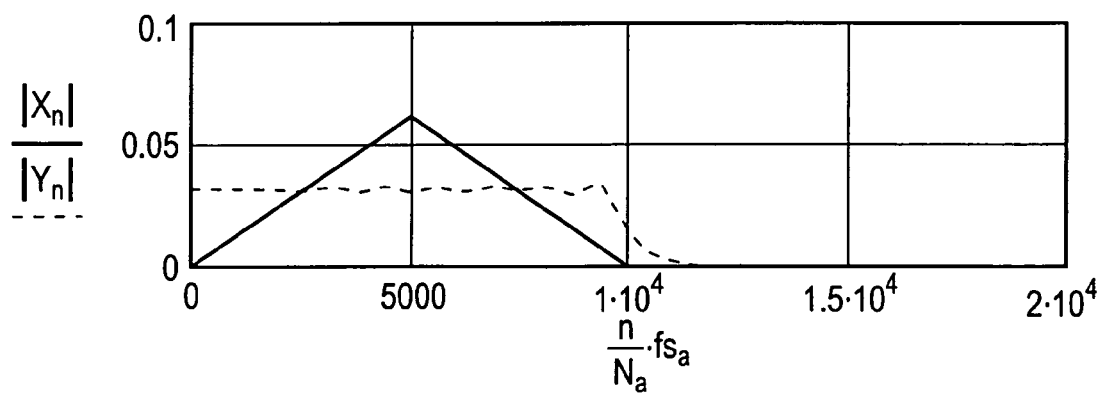
Figure 7:
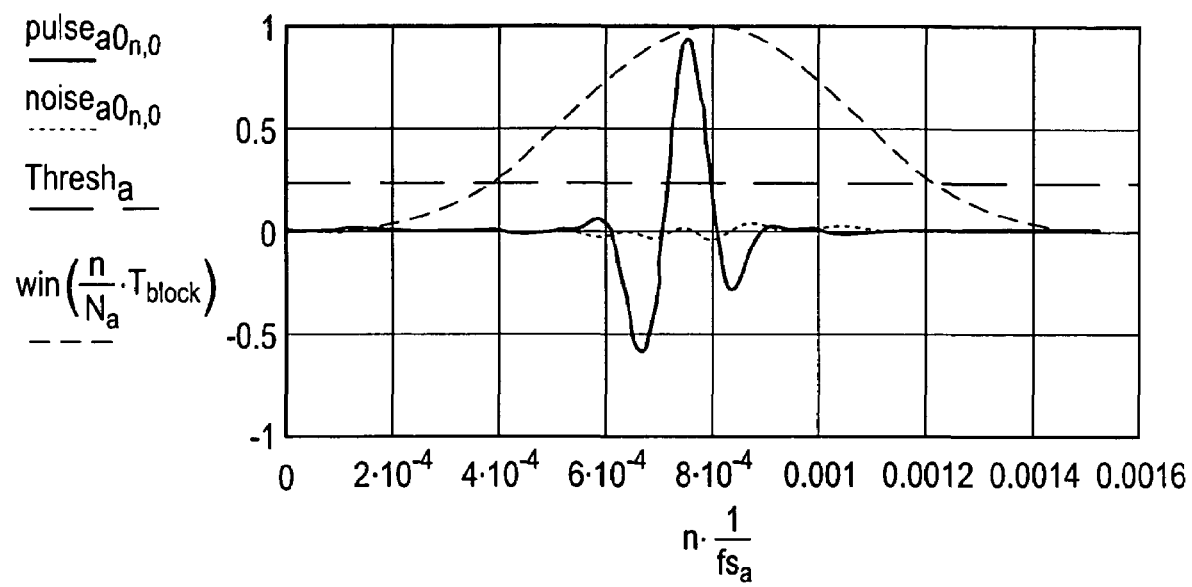
Figure 8:
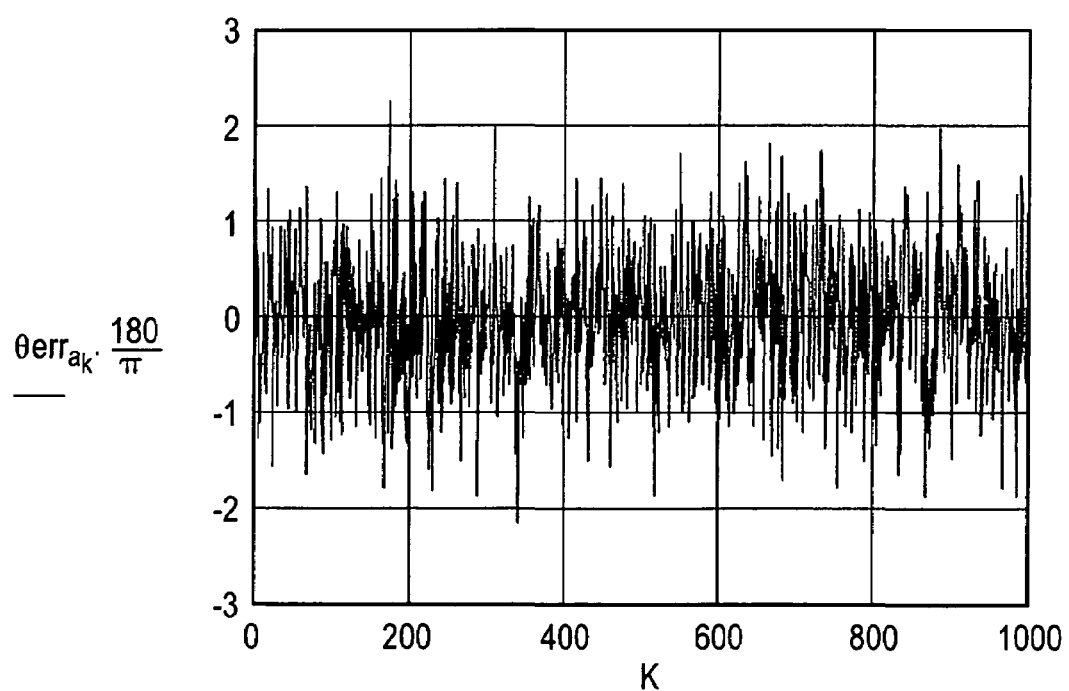
Figure 9:
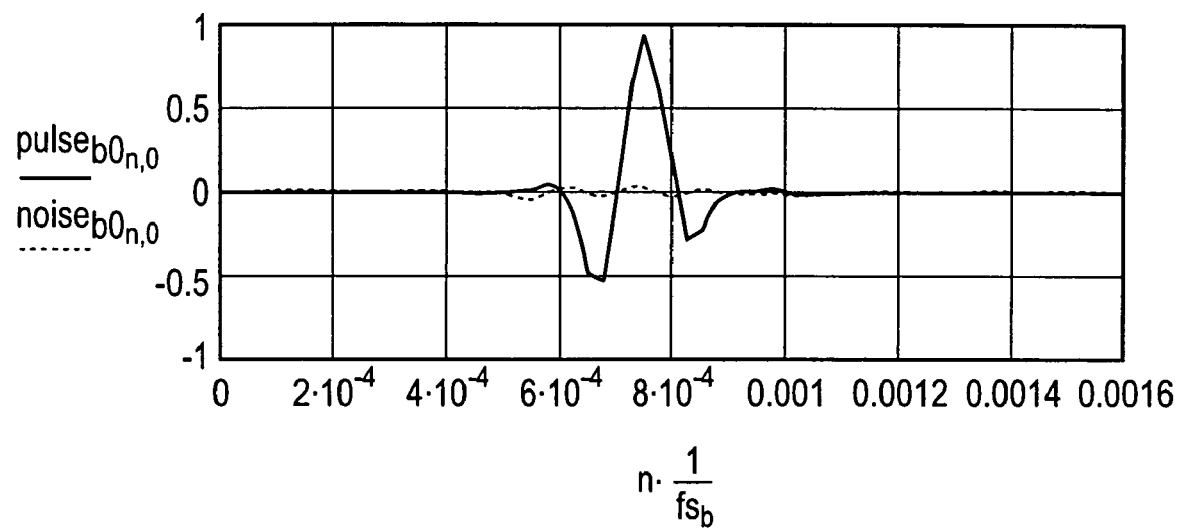
FIG. 9 is a graph shows a pulse waveform and noise waveform used in the simulation of method b.
Figure 10:
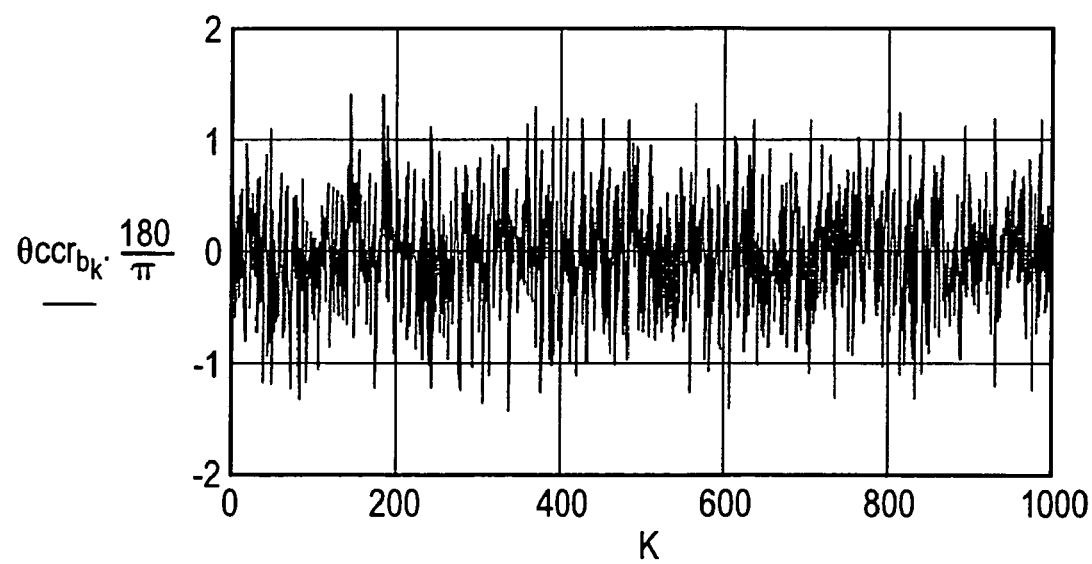
FIG. 10 is a graph showing bearing errors calculated in the simulation of method b.
Figure 11:
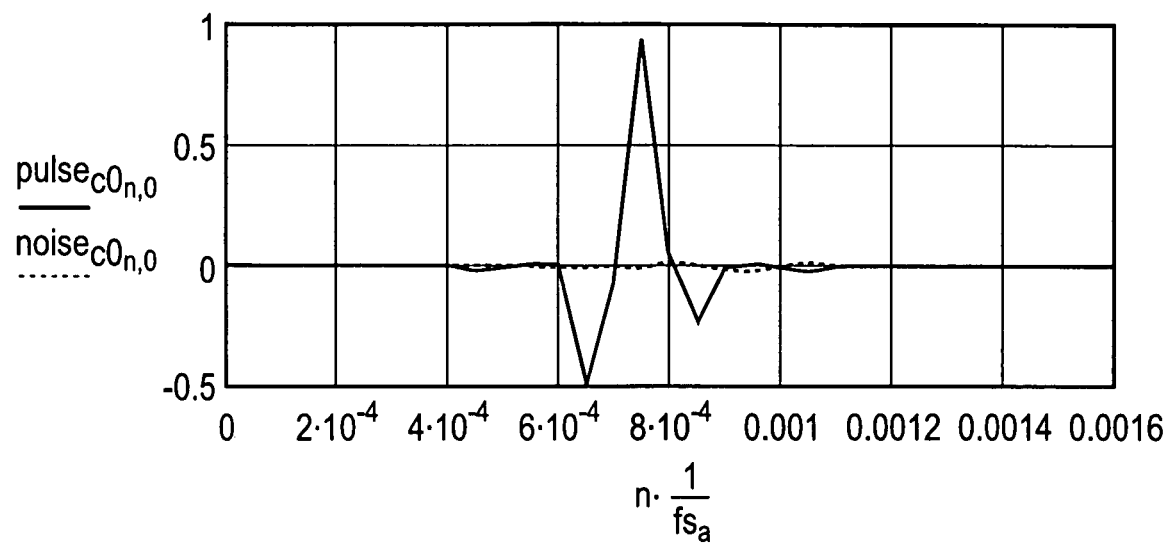
FIG. 11 is a graph shows a pulse waveform and noise waveform used in the simulation of method c.
Figure 12:
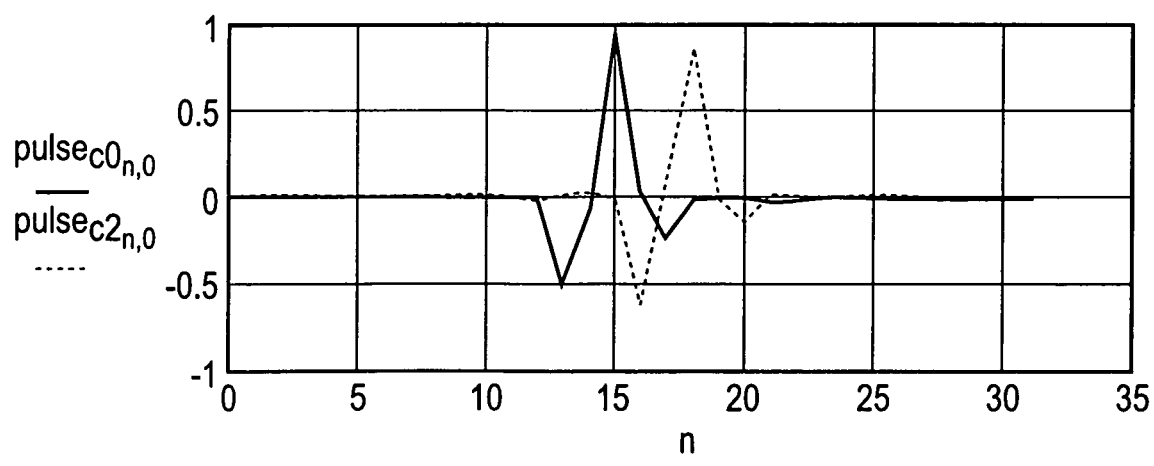
FIG. 12 is a graph showing pulse waveforms from two sensors c0 and c2.
Figure 13:
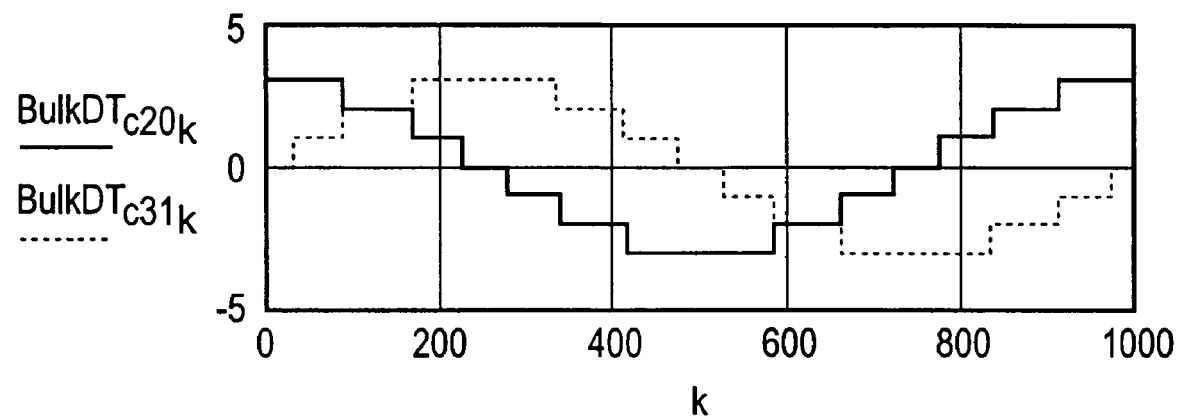
FIG. 13 is a graph showing bulk delays for microphone pairs c20 and c31.
Figure 14:
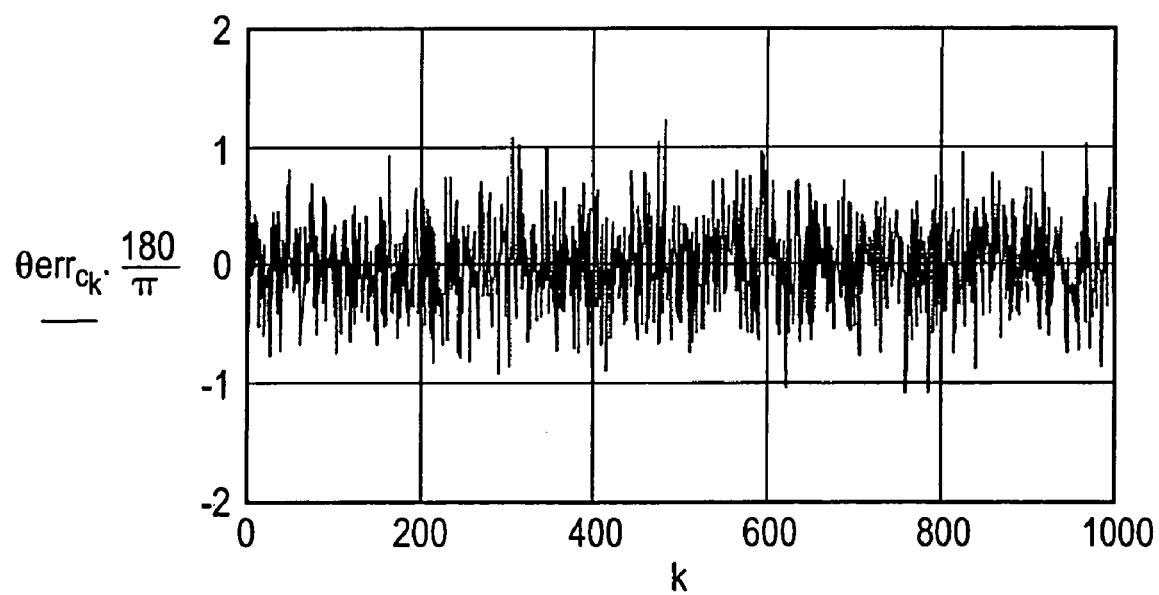
FIG. 14 is a graph showing bearing errors calculated in the simulation of method c.

FIG. 3B is a schematic view of the components of an alternative acoustic sensor device. The device is similar to the device of FIG. 3a but includes an orientation sensor 23. The orientation sensor 23 contains an inclinometer (which measures the elevation angle of the device relative to the gravity vector) and a compass (which measures the azimuth angle of the device relative to the earth's magnetic field vector). Thus the sensor 23 provides an output indicative of the sensor's direction in space. The device of FIG. 3B operates as follows:

1. The sensor array 20 outputs an estimated range and direction of a target to the DSP 22;
2. The range display outputs the estimated range;
3. The orientation sensor 23 senses the current orientation of the device, and outputs to the DSP;
4. As the rifle is re-oriented, the DSP compares the estimated direction of the target with the current orientation of the device;
5. If the device is aligned with a horizontal plane containing the estimated target direction, then the two LEDs 9 on the left and right-hand side of the range display shown in FIG. 2 change from red to green;
6. If the device is aligned with a vertical plane containing the estimated target direction, then the two LEDs 9 above and below the range display shown in FIG. 2 change from red to green.

The comparison in step 4 remains valid whilst the translational position in space of the device is close to the position where the sensor array 20 measured the range and direction. This enables the device to give an immediate detection and localization of a target such as a sniper (for example to a particular window or building) after which usual tactics would apply.

The networked system shown in FIG. 3a enables the device to be coupled with GPS data 24 which can be used to fix the translational position of the device, and thus update the estimated range and direction of the target as the device is translated.

Extraction of the direction of the target involves two essential steps: (i) measure the propagation delay across the array, and (ii) infer the direction of arrival.

A feature of the sensor array is that it includes three orthogonal axes each with two microphones.

Therefore, direction can simply be extracted by computing the time delay component along each axis, and resolving them to form a direction vector. This direct form of direction estimation is simpler than say a full maximum-likelihood power vs bearing scan of the array, with almost as good results for high SNR pulses.

The preferred method of calculating direction will now be contrasted with other methods which may also be performed by the DSP 22. Three candidate methods are considered in detail:
  a) Measure the time of arrival of the pulse at each microphone using a threshold crossing technique. Form the direction vector from the three component delays.
  b) Cross-correlate each pair of microphones in the time domain, to estimate the delay based on the whole pulse shape. Form the direction vector from the three component delays.
  c) The preferred method: decompose the pulse into its spectral components; compute the phase delay for each component along each axis; hence create a direction spectrum (ie. power-weighted direction vector vs frequency); and sum the weighted direction vectors, to obtain the overall direction vector.

The relative advantages and disadvantages of each technique are discussed below.

Method 'a'

The array is small in terms of wavelengths (less than two wavelengths across) which means that if using a direct time-domain measurement method the signals must be sampled at a much higher rate (e.g. 400 kHz vs 20 kHz). This will increase power drain and increase the size of the electronics.

Method 'b'

The use of correlation-based time measurement means that the necessary high sample rate can be obtained post-correlation, by interpolation. Method 'b' also has the advantage over method 'a' that using the whole pulse shape provides averaging of the effects of noise, whereas using a threshold-crossing method yields just one time sample per event. However, for sensible length interpolation filters the basic sample rate would have to exceed the Nyquist rate by a factor.

Method 'c'

Method 'c' retains the advantage of method 'b' by using the whole pulse shape, but avoids the need to interpolate the correlation output to a very high effective sample rate, so allowing sampling at the Nyquist rate. The phase domain method also provides slightly improved accuracy through 'bearing coherent' averaging of noise, rather than just temporal averaging of noise.

Some more explanation of method c. will now be given. An alternative method of using phase in the direction estimation (employing a power vs bearing scan) will also be described.

The signal vector, across all six microphones, for a signal at elevation θ and azimuth θ is as follows:

$$s(\theta, \psi, \lambda) = \begin{pmatrix} e^{j \cdot 2\pi \cdot \frac{r}{\lambda} \cdot \cos(\psi) \cdot \cos(\theta)} \\ e^{j \cdot 2\pi \cdot \frac{r}{\lambda} \cdot \sin(\psi) \cdot \cos(\theta)} \\ e^{-j \cdot 2\pi \cdot \frac{r}{\lambda} \cdot \cos(\psi) \cdot \cos(\theta)} \\ e^{-j \cdot 2\pi \cdot \frac{r}{\lambda} \cdot \sin(\psi) \cdot \cos(\theta)} \\ e^{j \cdot 2\pi \cdot \frac{r}{\lambda} \cdot \cos(\theta)} \\ e^{-j \cdot 2\pi \cdot \frac{r}{\lambda} \cdot \cos(\theta)} \end{pmatrix}$$

So the received signal, at true direction $(\theta_0, \psi_0)$, in the presence of noise, is $$x(\lambda) = s(\theta_o, \psi_o, \lambda) + \begin{pmatrix} n_0 \\ n_1 \\ n_2 \\ n_3 \\ n_4 \\ n_5 \end{pmatrix}$$

The optimal method of estimating the signal direction, assuming uncorrelated background noise would be to do a power vs bearing scan. ie. for beamweights w given by:

$$w(\theta,\psi,\lambda) = (\overline{s(\theta,\psi,\lambda)})^T$$

we find the θ and ψ that maximise the following expression $$P = w \cdot X \cdot \overline{w}^T$$

where $$X = x(\lambda) \cdot \overline{x(\lambda)}^T$$

However this is overcomplicated for the preferred application.

Let us consider a modified signal vector, in which opposite microphones along each axis are cross-correlated (or equivalently, the complex frequency-domain signals are multiplied in conjugate).

E.g. taking microphones 0 and 2 we have our correlated x-axis sensor:

$$a_x = s_0 \cdot \overline{s_2}$$
$$= e^{j \cdot 2\pi \cdot \frac{r}{\lambda} \cdot \cos(\psi) \cdot \cos(\theta)} \cdot \overline{e^{-j \cdot 2\pi \cdot \frac{r}{\lambda} \cdot \cos(\psi) \cdot \cos(\theta)}}$$
$$= e^{j \cdot 4\pi \cdot \frac{r}{\lambda} \cdot \cos(\psi) \cdot \cos(\theta)}$$

Therefore $$a(\theta, \psi, \lambda) = e^{j \cdot \phi(\theta,\psi,\lambda)}$$

where $$\phi(\theta, \psi, \lambda) = \begin{pmatrix} 4 \cdot \pi \cdot \frac{r}{\lambda} \cdot \cos(\psi) \cdot \cos(\theta) \\ 4 \cdot \pi \cdot \frac{r}{\lambda} \cdot \sin(\psi) \cdot \cos(\theta) \\ 4 \cdot \pi \cdot \frac{r}{\lambda} \cdot \cos(\theta) \end{pmatrix}$$

But the direction vector of the true signal (in x y z coordinates) is as follows:

$$d(\theta, \psi) = \begin{pmatrix} \cos(\psi) \cdot \cos(\theta) \\ \sin(\psi) \cdot \cos(\theta) \\ \cos(\theta) \end{pmatrix}$$

Therefore we see the following relationship, from which signal direction is obtained directly:

$$\phi(\theta, \psi, \lambda) = 4 \cdot \pi \cdot \frac{r}{\lambda} \cdot d(\theta, \psi)$$

Therefore, in words, the phase of the cross-correlated microphone pairs, directly yields the signal direction vector, to within a frequency-dependent scale factor. Therefore by analysing the phase of the received pulse, we can estimate the bearing of each spectral component. We can then produce an overall bearing estimate from the power-weighted sum of the component direction vectors. This is not quite optimal (compared to a power bearing scan) but is simpler. Also it does not require any of the microphones to be matched in gain, and only requires them to be phase-matched in pairs, which simplifies construction or calibration of the array.

Example Calculations

| | | |
|---|---|---|
| Maximum frequency | fmax := 10000 | Hz |
| Speed of sound in air | c := 344 | m/s |
| Acoustic radius of array | r := 0.025 | m |
| Acoustic wavelength | $\lambda\min := \frac{c}{f\max}$  $\lambda\min = 0.0344$ | m |
| Acoustic diameter in wavelengths | $\frac{2 \cdot r}{\lambda\max} = 1.4535$ | |
| Time delay across array | $\tau := \frac{2 \cdot r}{c}$  $\tau \cdot 10^6 = 145.35$ | µs |
| Time delay for 1 degree bearing | $\tau_1 := \tau \cdot \sin\left(1 \cdot \frac{\pi}{180}\right)$  $\tau_1 \cdot 10^6 = 2.536687$ | µs |
| Sample rate for Nyquist sampling | $fs_{Nyq} := 2 \cdot f\max$  $fs_{Nyq} \cdot 10^{-3} = 20$ | kHz |
| Sample rate to resolve 1 degree change | $fs_{1deg} := \frac{1}{\tau_1}$  $fs_{1deg} \cdot 10^{-3} = 394.21$ | kHz |

$$T_{block} := \frac{16}{f\max}$$

$$T_{block} \cdot 10^3 = 1.6$$

$$fs_a := 32 \cdot f\max$$

$$fs_b := 4 \cdot f\max$$

$$fs_c := 2 \cdot f\max$$

$$fs_a \cdot 10^{-3} = 320$$

$$fs_b \cdot 10^{-3} = 40$$

$$fs_c \cdot 10^{-3} = 20$$

$$N_a := \text{round}(T_{block} \cdot fs_a)$$

$$N_b := \text{round}(T_{block} \cdot fs_b)$$

$$N_c := \text{round}(T_{block} \cdot fs_c)$$

$$N_a = 512$$

$$N_b = 64$$

$$N_c = 32$$

Nominal pulse, and (approximately) equal energy flat-spectrum pulse used to generate noise.

We assume that the pulse is windowed or gated, so as to exclude extraneous noise.

Three Algorithms Compared

The three algorithms are compared using a simple simulation.

A band-limited pulse is constructed.

An uncorrelated noise background is obtained by phase-randomising band-limited pulses, to ensure simulation consistency regardless of sample rate.

The scenario is run 100 times, with a different true pulse bearing each time, and the resulting accuracy is compared for the three methods.

Sample rates and data collection block lengths for the three methods:

$$f_o := \frac{f\max}{2}$$

$$sync(x) := \text{if}\left(x = 0, 1, \frac{\sin(x)}{x}\right)$$

$$win(t) := \sin\left(\pi \cdot \frac{t}{T_{block}}\right)^4$$

$$p(t) := \begin{aligned} & sync\left[2 \cdot \pi \cdot \frac{f_o}{2} \cdot \left(t - \frac{T_{block}}{2}\right)\right]^2 \cdot \\ & \sin\left[2 \cdot \pi \cdot f_o \cdot \left(t - \frac{T_{block}}{2}\right) + \frac{\pi}{4}\right] \end{aligned}$$

-continued $$q(t) := \frac{\text{sync}\left[2\cdot\pi\cdot f_o\cdot\left(t-\frac{T_{block}}{2}\right)\right]\cdot}{\cos\left[2\cdot\pi\cdot f_o\cdot\left(t-\frac{T_{block}}{2}\right)\right]}$$

$n := 0 \ldots N_a - 1$ $x_n := p\left(n\cdot\frac{1}{fs_a}\right)$ $X := FFT(x)$ $y_n := q\left(n\cdot\frac{1}{fs_a}\right)$ $Y := FFT(y)$ $SNR_{adjustdB} := 20\cdot\log\left(\frac{stdev(x)}{stdev(y)}\right)$ $SNR_{adjustdB} := 1.4118$ Common simulation parameters and functions
$K := 1000$
$k := 0 \ldots K-1$ $$\theta_k := 2\cdot\pi\cdot\frac{k}{K}$$

$SNR_{dB} := 16$ $$getpulse(N, fs, \text{delay}) := \begin{vmatrix} \text{for } n \in 0 \ldots N-1 \\ x_n \leftarrow p\left(n\cdot\frac{1}{fs}-\text{delay}\right)\cdot\text{win}\left(\frac{n}{N}\cdot T_{block}\right) \\ x \end{vmatrix}$$

$$getnoise(N, fs, SNR_{dB}) := \begin{vmatrix} \text{for } n \in 0 \ldots N-1 \\ \begin{vmatrix} x_n \leftarrow q\left(n\cdot\frac{1}{fs}\right) \\ w_n \leftarrow \text{win}\left(\frac{n}{N}\cdot T_{block}\right) \end{vmatrix} \\ X \leftarrow CFFT(x) \\ \phi \leftarrow \text{runif}(N, -\pi, \pi) \\ \text{for } n \in 0 \ldots N-1 \\ Y_n \leftarrow |X_n|\cdot e^{j\cdot\phi_n} \\ y \leftarrow \text{Re}(ICFFT(Y))\cdot 10^{-\frac{SNR_{dB}-SNR_{adjustdB}}{20}} \\ \overrightarrow{(y\cdot w)} \end{vmatrix}$$

Method 'a'
Generate pulses for each of 100 bearings, for 4 microphones (0=north, 1=east, 2=south, 3=west)

$pulse_{a0}^{\langle k\rangle} := getpulse\left(N_a, fs_a, -\frac{r}{c}\cdot\cos(\theta_k)\right)$ $pulse_{a1}^{\langle k\rangle} := getpulse\left(N_a, fs_a, -\frac{r}{c}\cdot\sin(\theta_k)\right)$ $pulse_{a2}^{\langle k\rangle} := getpulse\left(N_a, fs_a, \frac{r}{c}\cdot\cos(\theta_k)\right)$ $pulse_{a3}^{\langle k\rangle} := getpulse\left(N_a, fs_a, \frac{r}{c}\cdot\sin(\theta_k)\right)$ Generate noise waveforms $noise_{a0}^{\langle k\rangle} := getnoise(N_a, fs_a, SNR_{dB})$ $noise_{a1}^{\langle k\rangle} := getnoise(N_a, fs_a, SNR_{dB})$ $noise_{a2}^{\langle k\rangle} := getnoise(N_a, fs_a, SNR_{dB})$ $noise_{a3}^{\langle k\rangle} := getnoise(N_a, fs_a, SNR_{dB})$ Pulse detection threshold (say set at 4 sigma wrt noise, or ¼ of the peak, whichever is greater)

$Thresh_a := \max\left(4\cdot stdev(noise_{a0}), \frac{1}{4}\cdot\max(pulse_{a0})\right)$ $Thresh_a = 0.2392$ $n := 0 \ldots N_a - 1$ Compute times of arrival for each pulse $$getTOA(x, T) := \begin{vmatrix} n \leftarrow 0 \\ \text{while } (x_n < T)\cdot(n < N_a - 1) \\ n \leftarrow n + 1 \\ n \end{vmatrix}$$

$TOA_{a0_k} := getTOA(pulse_{a0}^{\langle k\rangle} + noise_{a0}^{\langle k\rangle}, Thresh_a)$ $TOA_{a1_k} := getTOA(pulse_{a1}^{\langle k\rangle} + noise_{a1}^{\langle k\rangle}, Thresh_a)$ $TOA_{a2_k} := getTOA(pulse_{a2}^{\langle k\rangle} + noise_{a2}^{\langle k\rangle}, Thresh_a)$ $TOA_{a3_k} := getTOA(pulse_{a3}^{\langle k\rangle} + noise_{a3}^{\langle k\rangle}, Thresh_a)$ Compute bearing error for each pulse $\theta err_{a_k} := \arg[[(TOA_{a2_k}-TOA_{a0_k})+j\cdot(TOA_{a3_k}-TOA_{a1_k})]\cdot e^{-j\cdot\theta_k}]$ Method 'b'
Generate pulses for each of 100 bearings, for 4 microphones (0=north, 1=east, 2=south, 3=west)

$pulse_{b0}^{\langle k\rangle} := getpulse\left(N_b, fs_b, -\frac{r}{c}\cdot\cos(\theta_k)\right)$ $pulse_{b1}^{\langle k\rangle} := getpulse\left(N_b, fs_b, -\frac{r}{c}\cdot\sin(\theta_k)\right)$ $pulse_{b2}^{\langle k\rangle} := getpulse\left(N_b, fs_b, \frac{r}{c}\cdot\cos(\theta_k)\right)$ $pulse_{b3}^{\langle k\rangle} := getpulse\left(N_b, fs_b, \frac{r}{c}\cdot\sin(\theta_k)\right)$ Generate noise waveforms $noise_{b0}^{\langle k\rangle} := getnoise(N_b, fs_b, SNR_{dB})$ $noise_{b1}^{\langle k\rangle} := getnoise(N_b, fs_b, SNR_{dB})$ $noise_{b2}^{\langle k\rangle} := getnoise(N_b, fs_b, SNR_{dB})$ $noise_{b3}^{\langle k\rangle} := getnoise(N_b, fs_b, SNR_{dB})$ $n := 0 \ldots N_b - 1$ Compute time delays for each axis by circular correlation and interpolation $$getDT(x, y) := \begin{vmatrix} X \leftarrow CFFT(x) \\ Y \leftarrow CFFT(y) \\ Z \leftarrow \overrightarrow{(X \cdot \overline{Y})} \\ \text{for } n \in 0 \ldots N_a - 1 \\ \quad Z_{intp_n} \leftarrow 0 \\ \text{for } n \in 1 \ldots \frac{N_b}{2} - 1 \\ \quad Z_{intp_n} \leftarrow Z_n \\ \quad Z_{intp_{N_a-n}} \leftarrow Z_{N_b-n} \\ z_{intp} \leftarrow ICFFT(z_{intp}) \\ \text{for } n \in 0 \ldots N_a - 1 \\ \quad sortarray_{n,0} \leftarrow n \\ \quad sortarray_{n,1} \leftarrow |z_{intp_n}| \\ \text{mod}\left(csort(sortarray, 1)_{N_a-1,0} + \frac{N_a}{2}, N_a\right) - \frac{N_a}{2} \end{vmatrix}$$

$$DT_{b20_k} := getDT\left(pulse_{b2}^{\langle k \rangle} + noise_{b2}^{\langle k \rangle}, pulse_{b0}^{\langle k \rangle} + noise_{b0}^{\langle k \rangle}\right)$$

$$DT_{b31_k} := getDT\left(pulse_{b3}^{\langle k \rangle} + noise_{b3}^{\langle k \rangle}, pulse_{b1}^{\langle k \rangle} + noise_{b1}^{\langle k \rangle}\right)$$

Compute each bearing error for each pulse $$\theta err_{b_k} := \arg[(DT_{b20_k} + j \cdot DT_{b31_k}) \cdot e^{-j\theta_k}]$$

Method 'c'

Generate pulses for each of 100 bearings, for 4 microphones (0=north, 1=east, 2=south, 3=west)

$$pulse_{c0}^{\langle k \rangle} := getpulse\left(N_c, fs_c, -\frac{r}{c} \cdot \cos(\theta_k)\right)$$

$$pulse_{c1}^{\langle k \rangle} := getpulse\left(N_c, fs_c, -\frac{r}{c} \cdot \sin(\theta_k)\right)$$

$$pulse_{c2}^{\langle k \rangle} := getpulse\left(N_c, fs_c, \frac{r}{c} \cdot \cos(\theta_k)\right)$$

$$pulse_{c3}^{\langle k \rangle} := getpulse\left(N_c, fs_c, \frac{r}{c} \cdot \sin(\theta_k)\right)$$

Generate noise waveforms $$noise_{c0}^{<k>} := getnoise(N_c, fs_c, SNR_{dB})$$

$$noise_{c1}^{<k>} := getnoise(N_c, fs_c, SNR_{dB})$$

$$noise_{c2}^{<k>} := getnoise(N_c, fs_c, SNR_{dB})$$

$$noise_{c3}^{<k>} := getnoise(N_c, fs_c, SNR_{dB})$$

$$n := 0 \ldots N_c - 1$$

Compute spectra for each microphone $$X_{c0}^{<k>} := FFT(pulse_{c0}^{<k>} + noise_{c0}^{<k>})$$

$$X_{c1}^{<k>} := FFT(pulse_{c1}^{<k>} + noise_{c1}^{<k>})$$

$$X_{c2}^{<k>} := FFT(pulse_{c2}^{<k>} + noise_{c2}^{<k>})$$

$$X_{c3}^{<k>} := FFT(pulse_{c3}^{<k>} + noise_{c3}^{<k>})$$

Compute bulk delays (by circular correlation, without interpolation) to a resolution of 1 sample (ie. half wavelength max) to eliminate phase ambiguity.

$$getBulkDT(x, y) := \begin{vmatrix} X \leftarrow CFFT(x) \\ Y \leftarrow CFFT(y) \\ Z \leftarrow \overrightarrow{(X \cdot \overline{Y})} \\ z \leftarrow ICFFT(Z) \\ \text{for } n \in 0 \ldots N_c - 1 \\ \quad sortarray_{n,0} \leftarrow n \\ \quad sortarray_{n,1} \leftarrow |z_n| \\ \text{mod}\left(csort(sortarray, 1)_{N_c-1,0} + \frac{N_c}{2}, N_c\right) - \frac{N_c}{2} \end{vmatrix}$$

$$BulkDT_{c20_k} := getBulkDT\left(pulse_{c2}^{\langle k \rangle} + noise_{c2}^{\langle k \rangle}, pulse_{c0}^{\langle k \rangle} + noise_{c0}^{\langle k \rangle}\right)$$

$$BulkDT_{c31_k} := getBulkDT\left(pulse_{c3}^{\langle k \rangle} + noise_{c3}^{\langle k \rangle}, pulse_{c1}^{\langle k \rangle} + noise_{c1}^{\langle k \rangle}\right)$$

Compute direction vector spectrum, accounting for bulk delay phase ambiguity.

Frequency Resolution:

$$N_c = 32$$

$$\delta f_c := \frac{fs_c}{N_c}$$

$$\delta f_c = 625$$

$$freq_c(n) := \left(\text{mod}\left(n + \frac{N_c}{2}, N_c\right) - \frac{N_c}{2}\right) \cdot \frac{fs_c}{N_c}$$

$$arrgh(x) := \text{if}(x = 0, 0, \arg(x))$$

$$getDvecspect\begin{pmatrix} X0, X1, X2, \\ X3, DT20, DT31 \end{pmatrix} := \begin{vmatrix} \text{for } n \in 0 \ldots \frac{N_c}{2} - 1 \\ \quad f \leftarrow freq_c(n) \\ \quad z02 \leftarrow X0_n \cdot \overline{X2_n} \\ \quad z13 \leftarrow X1_n \cdot \overline{X3_n} \\ \quad \phi_{adj20} \leftarrow 2 \cdot \pi \cdot DT20 \cdot \frac{f}{fs_c} \\ \quad \phi_{adj31} \leftarrow 2 \cdot \pi \cdot DT31 \cdot \frac{f}{fs_c} \\ \quad \theta_{02_n} \leftarrow arrgh(z02 \cdot e^{-j\phi_{adj20}}) + \phi_{adj20} \\ \quad \theta_{13_n} \leftarrow arrgh(z13 \cdot e^{-j\phi_{adj31}}) + \phi_{adj31} \\ \quad m_n \leftarrow \sqrt{|z02 \cdot z13|} \\ \text{for } n \in 0 \ldots \frac{N_c}{2} - 1 \\ \quad Dvec_n \leftarrow m_n \cdot (\theta_{02_n} + j \cdot \theta_{13_n}) \\ Dvec \end{vmatrix}$$

$$Dvec^{\langle k \rangle} := getDvecspect\left(X_{c0}^{\langle k \rangle}, X_{c1}^{\langle k \rangle}, X_{c2}^{\langle k \rangle}, X_{c3}^{\langle k \rangle}, BulkDT_{c20_k}, BulkDT_{c31_k}\right)$$

Compute weighted sum direction vector $$Dvecsum_k := \sum_{n=0}^{\frac{N_c}{2}-1} Dvec_{n,k}$$

Compute bearing error for each pulse $$\theta err_{c_k} := \arg(Dvecsum_k \cdot e^{-j\theta_k})$$

Now compare the three results:

$$\begin{pmatrix} stdev(\theta err_a) & \text{median}(|\overrightarrow{\theta err_a}|) & \max(|\overrightarrow{\theta err_a}|) \\ stdev(\theta err_b) & \text{median}(|\overrightarrow{\theta err_b}|) & \max(|\overrightarrow{\theta err_b}|) \\ stdev(\theta err_c) & \text{median}(|\overrightarrow{\theta err_c}|) & \max(|\overrightarrow{\theta err_c}|) \end{pmatrix} \cdot \frac{180}{\pi} = \begin{pmatrix} 0.6928 & 0.4886 & 2.2567 \\ 0.5096 & 0.3562 & 1.4211 \\ 0.3638 & 0.2388 & 1.2215 \end{pmatrix}$$

So typically method c wins, whether compared in terms of standard deviation, median, or maximum error. However, the advantage is not overwhelming, so the main advantage is that we can use a lower sample rate (and hence use less standby power).

Note that this analysis does not account for frequency-dependent bearing distortion (e.g. short multipath reception), and so there may be further, possibly more significant, advantages in bearing coherent processing when more complex environments are considered.

Although the invention has been described above with reference to one or more preferred embodiments, it will be appreciated that various changes or modifications may be made without departing from the scope of the invention as defined in the appended claims.

What is claimed is:

1. A method of providing an indication of the direction of a target, the method comprising the steps of detecting a signal originating from the target with a plurality of pairs of sensors so as to generate a plurality of pairs of sensor signals; spectrally decomposing each sensor signal so as to generate a plurality of pairs of spectral components for each pair of sensor signals; calculating a phase delay between each pair of spectral components; estimating the direction of the target relative to a weapon in accordance with the calculated phase delays; and providing an indication when the weapon is aligned with the estimated direction of the target.

2. A method according to claim 1 wherein the signal is an acoustic signal.

3. A method according to claim 1 wherein the sensors are mounted on the weapon.

4. A method according claim 1 wherein the indication is provided by an indicator mounted on the weapon.

5. A method according to claim 1 further comprising detecting when the weapon is aligned with a vertical plane containing the estimated direction of the target;

and providing an indication as a result of that detection.

6. A method according to claim 1 further comprising detecting when the weapon is aligned with a horizontal plane containing the estimated direction of the target; and providing an indication as a result of that detection.

7. A method according to claim 1 wherein the indication is provided by displaying a visual indicator.

8. A method according to claim 1 wherein the plurality of sensors are arranged in a volumetric array.

9. A method according to claim 1 comprising detecting a muzzle signal, and estimating the direction of the target from the detected muzzle signal.

10. A method according to claim 1 further comprising detecting a projectile shock wave, estimating a range of the target from the detected projectile shock wave; and providing an indication of the estimated range of the target.

11. Apparatus for providing an indication of the direction of a target, the apparatus comprising a plurality of pairs of sensors for detecting a signal originating from the target so as to generate a plurality of pairs of sensor signals; a processor for processing the sensor signals to estimate the direction of the target relative to a weapon; and a direction indicator for providing an indication when the weapon is aligned with the estimated direction of the target; wherein the processor is programmed to process the sensor signals by spectrally decomposing each sensor signal so as to generate a plurality of pairs of spectral components for each pair of sensor signals; calculating a phase delay between each pair of spectral components, and estimating the direction of the target relative to a weapon in accordance with the calculated phase delays.

12. Apparatus according to claim 11 further comprising a common housing containing the sensor, indicator and processor.

13. A weapon comprising apparatus according to claim 11.

14. A weapon according to claim 13 wherein the weapon is a hand-held weapon.

15. A weapon according to claim 13 comprising a sight, wherein the or each sensor is mounted on the sight.

16. A weapon according to claim 13 comprising a sight, wherein the direction indicator is mounted on the sight.

17. A weapon according to any of claims 13 to 16 comprising a sight, wherein a range indicator is mounted on the sight.

18. A method of estimating the direction of arrival of an acoustic pulse, the method comprising:
   a. detecting the pulse with a plurality of sensors so as to generate a plurality of sensor signals;
   b. spectrally decomposing each sensor signal so as to generate one or more spectral components for each signal; and
   c. processing the spectral components to estimate the direction of arrival of the acoustic pulse, wherein the pulse is detected with a volumetric array of three or more pairs of sensors in step a. so as to generate three or more pairs of sensors signals; wherein a plurality of pairs of spectral components are generated in step b. for each pair of sensor signals; and wherein step c. includes calculating a phase delay between each pair of spectral components, and estimating the direction of arrival of the acoustic pulse in accordance with the calculated phase delays.

19. A method of detecting the direction of a target, the method comprising detecting the direction of arrival of an acoustic pulse from the target by a method according to claim 18, and inferring the direction of the target from the estimated direction of arrival.

20. A method of detecting the trajectory of a projectile, the method comprising detecting the direction of arrival of an acoustic pulse from the projectile by a method according to claim 18, and inferring the trajectory of the projectile from the estimated direction of arrival.

21. Apparatus for detecting the direction of arrival of an acoustic pulse by a method according to claim 18, the apparatus comprising a plurality of sensors;

and a processor programmed to perform steps b and c.

* * * * *